(12) United States Patent
Moon et al.

(10) Patent No.: US 10,193,856 B2
(45) Date of Patent: Jan. 29, 2019

(54) METHOD, TERMINAL, AND SERVER FOR PROVIDING COMMUNICATION SERVICE

(71) Applicant: Samsung Electronics Co., Ltd., Suwon-si, Gyeonggi-do (KR)

(72) Inventors: Sangjun Moon, Yongin-si (KR); Hyeonjin Kang, Seoul (KR); Jinhyoung Kim, Seoul (KR); Yongseok Park, Seoul (KR); Kangjin Yoon, Seoul (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 366 days.

(21) Appl. No.: 14/699,174

(22) Filed: Apr. 29, 2015

(65) Prior Publication Data

US 2015/0319132 A1 Nov. 5, 2015

(30) Foreign Application Priority Data

Apr. 30, 2014 (KR) .................. 10-2014-0052673

(51) Int. Cl.
*G06F 15/16* (2006.01)
*H04L 29/12* (2006.01)

(52) U.S. Cl.
CPC ........ *H04L 61/6004* (2013.01); *H04L 61/106* (2013.01); *H04L 61/255* (2013.01); *H04L 61/2521* (2013.01); *H04L 61/6077* (2013.01)

(58) Field of Classification Search
CPC .............................. H04L 29/12; H04L 61/106
USPC ......................................................... 709/206
See application file for complete search history.

(56) References Cited

U.S. PATENT DOCUMENTS

| 5,627,836 A * | 5/1997 | Conoscenti | H04L 49/201 348/E7.071 |
| 6,970,913 B1 * | 11/2005 | Albert | H04L 67/1008 370/389 |
| 9,143,558 B2 * | 9/2015 | Blander | H04L 67/1029 |
| 9,288,724 B1 * | 3/2016 | Narang | H04W 36/0066 |
| 9,820,324 B2 * | 11/2017 | Bergstrom | H04W 76/16 |
| 2004/0109458 A1 * | 6/2004 | Lakshmi Narayanan | H04L 12/66 370/401 |
| 2005/0013280 A1 * | 1/2005 | Buddhikot | H04L 29/12358 370/349 |
| 2006/0026301 A1 * | 2/2006 | Maeda | H04L 29/12339 709/246 |
| 2006/0098651 A1 * | 5/2006 | Joh | H04L 29/12273 370/389 |
| 2008/0056266 A1 * | 3/2008 | Lin | H04L 29/12264 370/392 |

(Continued)

*Primary Examiner* — Anthony Mejia
(74) *Attorney, Agent, or Firm* — Jefferson IP Law, LLP

(57) ABSTRACT

A method, a terminal, and a server for providing a communication service are provided. The terminal includes a communication unit which transmits a server a first message requesting for mapping a virtual address and a first Internet Protocol (IP) address and receives an IP packet including a first IP address from the server through a first communication network and a control unit which converts the first IP address to the virtual address mapped to the first IP address in the IP packet.

The present disclosure relates to a pre-5th-Generation (5G) or 5G communication system to be provided for supporting higher data rates Beyond 4th-Generation (4G) communication system such as Long Term Evolution (LTE).

18 Claims, 11 Drawing Sheets

(56) References Cited

U.S. PATENT DOCUMENTS

| | | | |
|---|---|---|---|
| 2008/0080519 A1* | 4/2008 | Park | H04L 29/12066 370/395.54 |
| 2008/0225806 A1* | 9/2008 | Arian | H04W 8/065 370/338 |
| 2009/0037998 A1* | 2/2009 | Adhya | G06Q 20/027 726/11 |
| 2009/0276842 A1* | 11/2009 | Yevmenkin | H04L 67/1002 726/13 |
| 2009/0287810 A1* | 11/2009 | Jalava | H04L 12/4641 709/223 |
| 2010/0128696 A1* | 5/2010 | Fantini | H04L 29/12028 370/331 |
| 2010/0151816 A1* | 6/2010 | Besehanic | G06Q 30/02 455/405 |
| 2010/0202410 A1* | 8/2010 | Watanabe | H04W 36/02 370/331 |
| 2010/0291920 A1 | 11/2010 | Lerzer et al. | |
| 2011/0252469 A1* | 10/2011 | Cho | H04L 63/0236 726/13 |
| 2012/0113893 A1* | 5/2012 | Damola | H04L 12/4633 370/328 |
| 2012/0170547 A1 | 7/2012 | Oprescu-Surcobe et al. | |
| 2013/0132532 A1* | 5/2013 | Zhang | H04L 41/0823 709/220 |
| 2013/0174177 A1* | 7/2013 | Newton | H04L 67/1008 718/105 |
| 2014/0040488 A1* | 2/2014 | Small | H04L 67/143 709/228 |
| 2015/0039762 A1* | 2/2015 | Xie | H04L 47/803 709/225 |
| 2016/0057105 A1* | 2/2016 | Kato | H04L 61/2592 370/315 |
| 2016/0277974 A1* | 9/2016 | Persson | H04W 48/16 |
| 2016/0295477 A1* | 10/2016 | Zhu | H04W 36/14 |

* cited by examiner

METHOD, TERMINAL, AND SERVER FOR PROVIDING COMMUNICATION SERVICE

CROSS-REFERENCE TO RELATED APPLICATION(S)

This application claims the benefit under 35 U.S.C. § 119(a) of a Korean patent application filed on Apr. 30, 2014 in the Korean Intellectual Property Office and assigned Serial number 10-2014-0052673, the entire disclosure of which is hereby incorporated by reference.

TECHNICAL FIELD

The present disclosure relates to a method, a terminal, and a server for providing a communication service. More particularly, the present disclosure relates to a communication service method for providing the communication service seamlessly to a terminal roaming across a plurality of networks.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, Mobile communication systems were developed to provide the subscribers with voice communication services on the move. With the rapid advance of technologies, the mobile communication systems have evolved to support high speed data communication services beyond the early voice-oriented services. This has contributed to the popularization of Internet use through mobile communication system. Meanwhile, the smartphones are designed to support cellular communication standards such as Long Term Evolution (LTE) and Internet Protocol (IP) network standard such as wireless fidelity (Wi-Fi).

Although it has a large coverage area, the LTE network gives expensive network cost and thus it is preferred to use the Wi-Fi network as far as possible. In the case of switching the Internet connection from the cellular communication network to the Wi-Fi network, it is necessary to perform a handover procedure in order to maintain the Internet connection.

FIG. 1 is a schematic diagram illustrating a system supporting a LTE network and a Wi-Fi network according to the related art.

Referring to FIG. 1, the communication system 1 of the related art supporting both the LTE and Wi-Fi network includes a base station 20, a Packet Data Network (PDN) Gateway (P-GW) 30, a server 50, an Access point (AP) 60, and a Wi-Fi Access Gateway (WAG) 70.

In the system of the related art, when switching between the LTE and Wi-Fi networks, the IP address changes so as to cause cutoff of the session, and the WAG 70 is responsible for maintaining the IP address. That is, in the case that the terminal 10' which is connected to the server 50 located on the Internet 40 with its IP address (IP1) through the LTE network performs vertical handover, it is necessary for the terminal 10' which has performed the vertical handover to hold the IP address in order to maintain the connection to the server 50 and, for this purpose, the WAG 70 provides a relay service.

That is, in order to maintain the IP address in switching between the LTE and Wi-Fi networks, the network operator has to deploy the WAG 70. Also, the user can be blessed with the seamless handover between the cellular and Wi-Fi networks in the state of being connected to the Wi-Fi AP interoperating with the WAG 70.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method, a terminal, and a server for providing a communication service that are capable of supporting seamless handover without extra equipment or facility such as Wireless Fidelity Access Gateway (WAG) in switching between a cellular network and a wireless Internet Protocol (IP) network.

Another aspect of the present disclosure is to provide a method, a terminal, and a server for providing a communication service that are capable of supporting seamless handover in switching between a cellular communication network and a wireless IP network regardless of the type of the Access point (AP) to which the terminal is connected without restriction to the connection to the AP interoperable with the WAG.

In accordance with an aspect of the present disclosure, a communication service method of a terminal is provided. The communication service method includes transmitting to a server a message requesting for mapping a virtual address and a first IP address, receiving an IP packet including the first IP address from the server through a first communication network, and converting the first IP address of the IP packet to a virtual address mapped to the first IP address.

In accordance with another aspect of the present disclosure, a terminal is provided. The terminal includes a communication unit which transmits a server a message requesting for mapping a virtual address and a first IP address and receives an IP packet including a first IP address from the server through a first communication network and a control unit which converts the first IP address to the virtual address mapped to the first IP address in the IP packet.

In accordance with another aspect of the present disclosure, a server is provided. The server includes a communication unit which receives a message requesting for mapping a virtual address and a first IP address from a terminal and receiving an IP packet including a first IP address from the terminal through a first communication network and a control unit which controls mapping the virtual address and the first IP address in response to the request message and converting the first IP address to the virtual address mapped to the first IP address in the IP packet.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted or clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to the Long Term Evolution (LTE) and LTE-Advanced (LTE-A) systems, it will be understood by those skilled in the art that the present disclosure can be applied even to other communication systems having the similar technical background and channel format, with a slight modification, without departing from the spirit and scope of the present disclosure.

Figure 1:
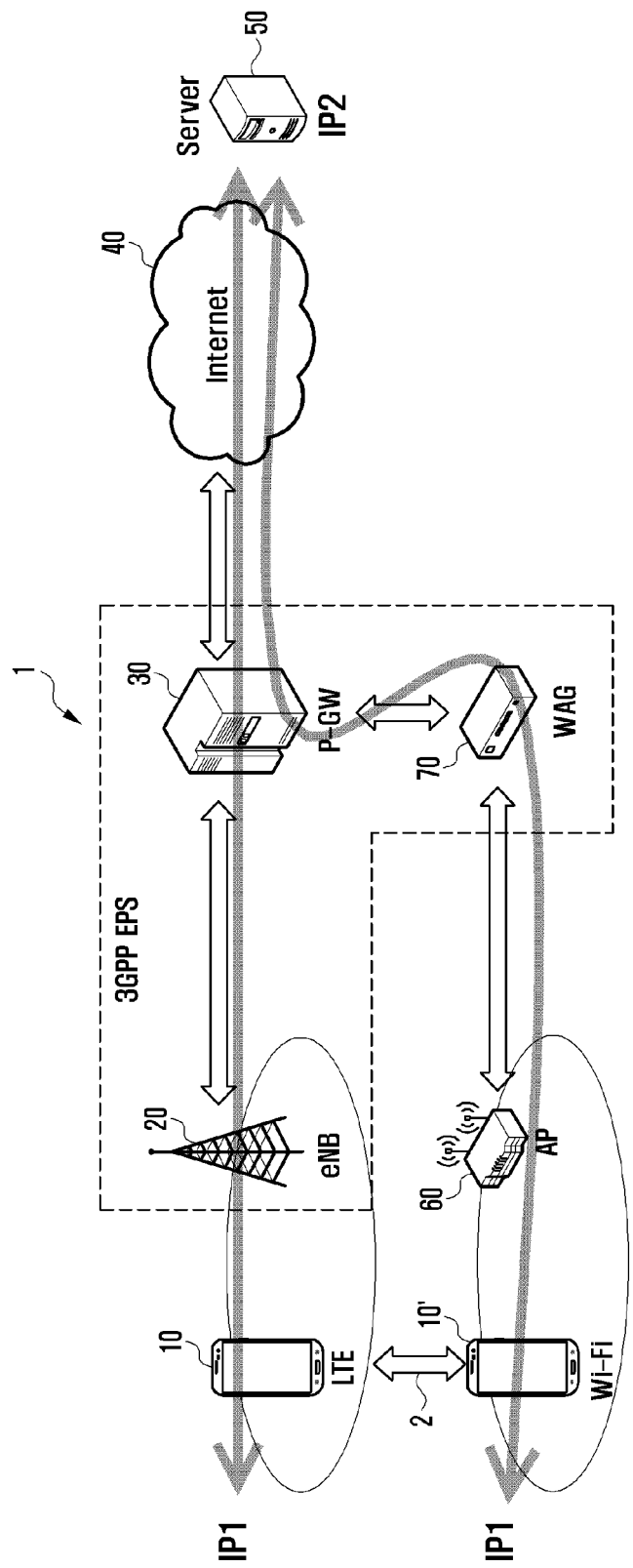
FIG. 1 is a schematic diagram illustrating a system supporting a Long Term Evolution (LTE) network and a wireless fidelity (Wi-Fi) network according to the related art.
Figure 2A:
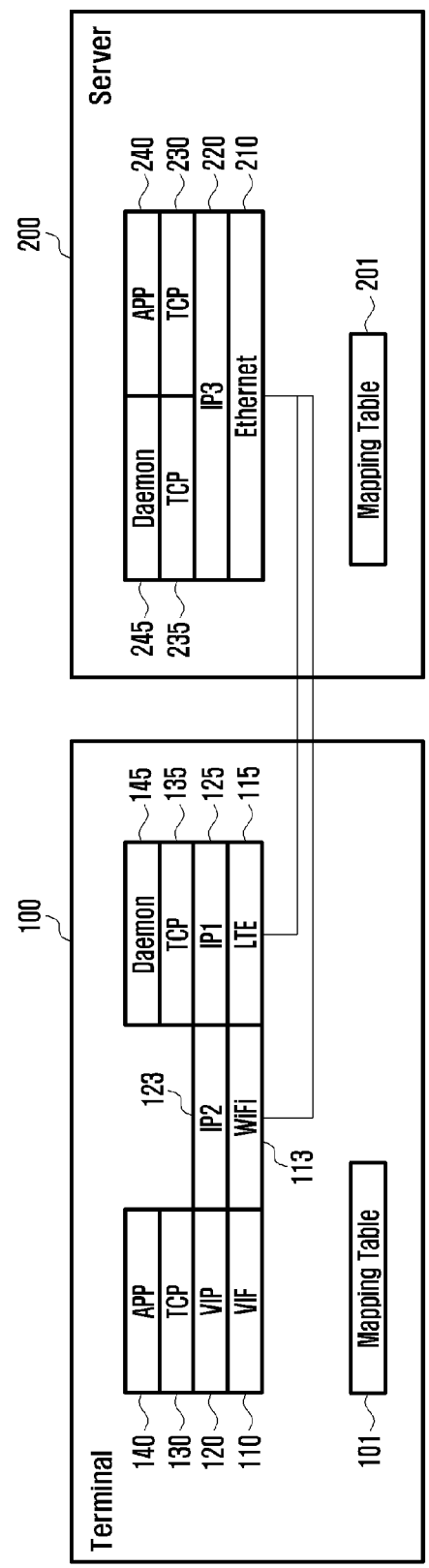
FIG. 2A is a diagram illustrating protocol stacks of a terminal and a server according to an embodiment of the present disclosure.

FIG. 2A is a diagram illustrating protocol stacks of a terminal and a server according to an embodiment of the present disclosure.

Referring to FIG. 2A, the terminal 100 may have a virtual address 120, a first IP address 125, and a second IP address 123.

The virtual address 120 may be allocated as a globally unique address or unique per server or application running on the terminal 100. The virtual address 120 may be generated based on at least one of a subnet address, an IP address of the server, a port number of the terminal, a port number of the server, and a Medium Access Control (MAC) address of the terminal, or received from the server.

The globally unique virtual address 120 may be allocated by a Virtual IP address allocation server. The server-specific unique address-based communication may be allowed by allocating suffix in addition to the subnet address using the terminal-specific Wi-Fi MAC address. For example, the terminal may generate its IP address of 192.168.X.X by substituting the last two octet of its Wi-Fi MAC address for the suffix X.X of the IP address.

In the case that two or more terminals use the same virtual address for one server, the corresponding flow may be discerned using even the port number. If the address is not discerned even using the port number, it is also possible to allocate the virtual address generated randomly. Actually, since the server-specific flow (virtual IP address, server IP address, port number of the terminal, and port number of the server) is unique, the uniqueness of the flow can be achieved by changing the virtual address in the state that the IP address and port number of the server and the port number of the terminal are fixed.

The protocol stack of the terminal 100 includes a Virtual Interface (VIF) layer 110, an Virtual Internet Protocol (VIP) layer 120 on the VIF layer 110, a Transmission Control Protocol (TCP) layer 130 on the VIP layer 120, and an Application (APP) layer 140 on the TCP layer 130. Here, the VIP layer 120 may use a virtual address, i.e. virtual IP address. In the following description, the VIP layer 120 is interchangeably referred to as VIP 120.

The terminal 100 may include a Wi-Fi layer 113 and an IP layer 123 on the Wi-Fi layer 113. Here, the IP layer 123 may use a second IP address (IP2).

The terminal 100 may include an LTE layer 115, an IP layer 125 on the LTE layer 115, a TCP layer 135 on the IP layer 125, and a Daemon layer 145 on the TCP layer 135. Here, the IP layer 125 may use a first IP address (IP1).

The terminal 100 may include a daemon 145 responsible for the function of the daemon layer 145. The daemon 145 may apply the seamless handover depending on whether the seamless handover is required per application. The daemon 145 may manage the information thereof. The daemon may manage the information based on the IP address and port of the server or the ID of the application.

The daemon 145 may perform communication with an LTE IP address and/or a Wi-Fi IP address. However, the Wi-Fi interface may be unstable in performing handover from Wi-Fi to LTE and, in this case, the daemon 145 performs inter-daemon signaling through the LTE interface automatically.

In order to check the LTE IP address and Wi-Fi IP address, the daemon 145 uses an Application Programming Interface (API) function provided by the Operating System (OS). For example, in Android OS, the daemon 145 may use getIPaddress( ) of WifiInfo Class to acquire the Wi-Fi IP address and getHostAddress( ) of IentAddress Class to acquire all interface-specific IP addresses.

The terminal 100 may store a mapping table 101. The mapping table 101 may include at least one of the virtual address 110, the IP address mapped to the virtual address 110, and mapping information for use in mapping the virtual address 110 and the IP address.

In the case that one server and one terminal use a plurality of sessions, the mapping table 101 may omit storing the information on the additional session as far as the mapping information of the VIP and Physical IP used previously in signaling between daemons is not changed. However, if even the port information is used, the information is not omitted.

The server 200 has an IP address (IP3). In an embodiment, the server may have a plurality of IP addresses that can be used for communication with one or more terminals.

The protocol stack of the server 200 includes an Ethernet layer 210, an IP layer 220 on the Ethernet layer 210, a TCP layer 235 on the IP layer 220, a daemon layer 245 on the TCP layer 235, a TCP layer 230 on the IP layer 220, and an APP layer 240 on the TCP layer 230.

The server 200 may store a mapping table 201. The mapping table 201 may include at least one of a virtual address 110, an IP address mapped to the virtual address 110, and mapping information for mapping the virtual address 110 and the IP address.

Figure 2B:
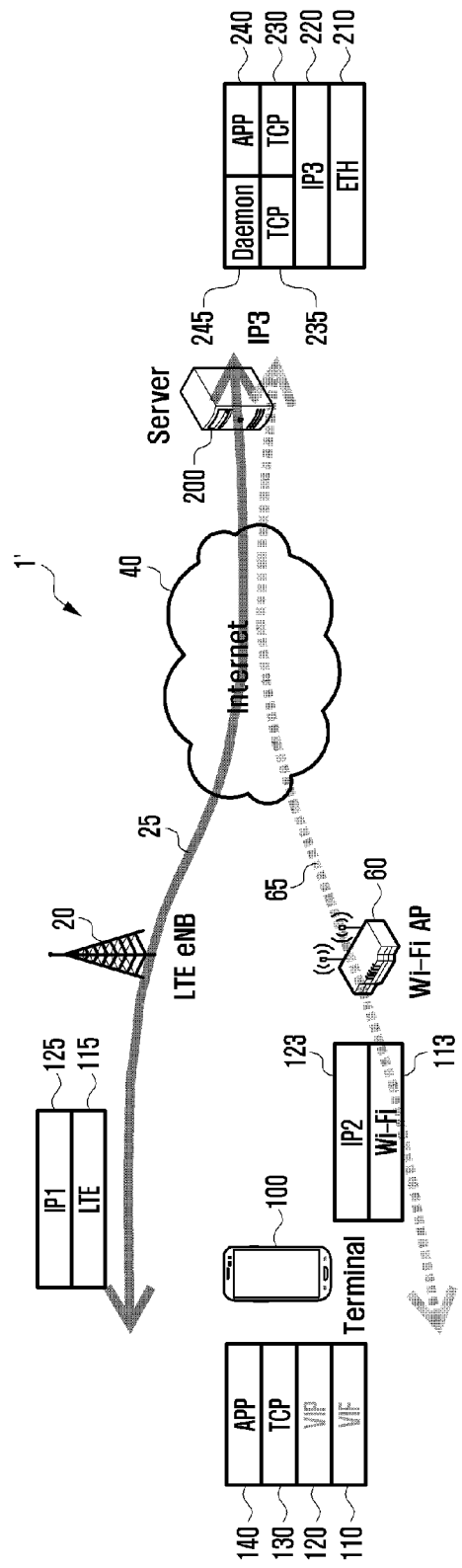
FIG. 2B is a schematic diagram illustrating a system supporting a LTE network and a Wi-Fi network according to an embodiment of the present disclosure.

FIG. 2B is a schematic diagram illustrating a system supporting a LTE network and a Wi-Fi network according to an embodiment of the present disclosure.

Referring to FIG. 2B, the communication system 1' includes a base station 20, a Packet Data Network Gateway (P-GW) 30, a server 50, and an Access Point (AP) 60. Here, the server 50 may locate on the Internet 40.

At the terminal 100, the packet received from the base station 20 is processed by the LTE layer 115 and the IP layer 125 first and then by the VIF layer 110, VIP layer 120, TCP layer 130, and APP layer 140 in order. The packet may be transmitted by the server 200 through the LTE network 25.

At the terminal, the packet received from the AP 60 is processed by the Wi-Fi layer 113 and IP layer 123 first and then by the VIF layer 110, VIP layer 120, TCP layer 130, and APP layer 140 in order. The packet may be transmitted by the server 200 through the Wi-Fi network 650.

At the server 200, the received packet is processed by the Ethernet layer 210, IP layer 220, TCP layer 235, and daemon layer 245 and then by the TCP layer 230 and APP layer 240 in order. Here, the packet may be transmitted by the terminal 100 through one of the LTE network 25 and the Wi-Fi network 65.

Figure 3:
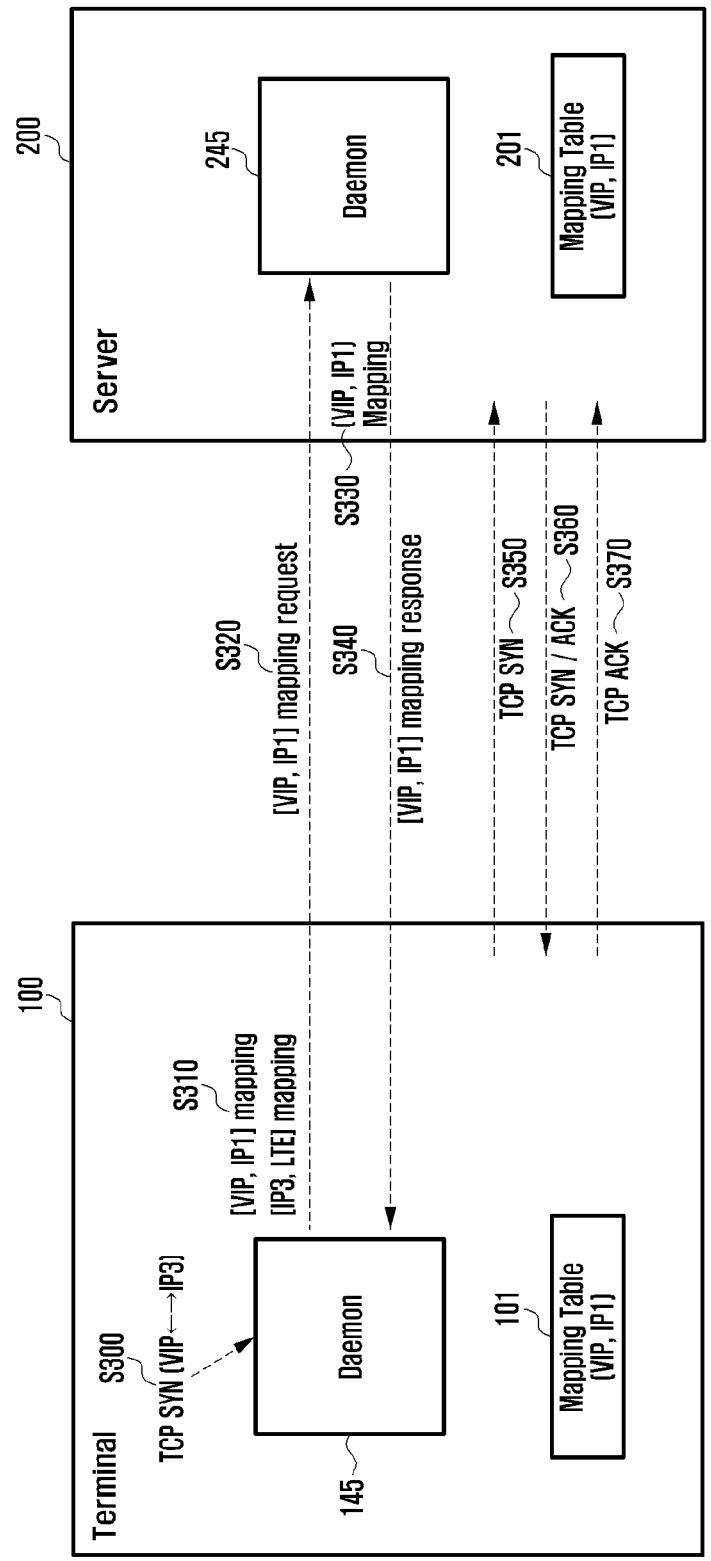
FIG. 3 is a diagram illustrating a connection establishment process of the communication service method according to an embodiment of the present disclosure.

FIG. 3 is a diagram illustrating a connection establishment process of the communication service method according to an embodiment of the present disclosure. FIG. 3 shows the connection establishment process in the TCP session setup procedure through an LTE network.

Referring to FIG. 3, the terminal 100 generates a TCP connection request between the virtual address (VIP) and the IP address (IP3) at operation S300. Here, the TCP connection request may be generated by the OS of the terminal 100 or an application running on the terminal 100, and the daemon 145 may receive the TCP connection request from the OS.

The terminal 100 maps the virtual address (VIP) to the IP address (IP1) and the IP address (IP3) to the LTE in the mapping table 101 at operation S310. The mapping table 101 may include the mapping information for mapping the virtual address (VIP) and the IP address (IP1) and the mapping information for mapping the IP address (IP3) and the LTE. The daemon 145 may control such that the mapping information for mapping the virtual address (VIP) to the IP address (IP1) and the mapping information for mapping the IP address (IP3) to the LTE are included in the mapping table 101.

The terminal 100 sends the server 200 a VIP-IP1 mapping request message at operation S320. This message may be transmitted through one of the LTE network 25 and Wi-Fi network 65.

Upon receipt of the request message, the server 200 maps the virtual address (VIP) to the IP address (IP1) at operation S330. At this time, the server 200 may include the mapping information for mapping the virtual address (VIP) to the IP address (IP1) in the mapping table 201. The daemon 245 may control such that the mapping information is included in the mapping table.

The server 200 sends the terminal 100 a response message in response to the request message at operation S340. The response message may include the information notifying of the mapping result.

The terminal 100 sends the server 200 a TCP SYN packet at operation S350. The TCP SYN packet may be transmitted after or regardless of the receipt of the response message. The TCP SYN packet may be transmitted through the LTE network 25 to request for TCP SYN between the IP addresses IP1 and IP3.

The server 200 sends the terminal 100 a TCP SYN/ACK packet at operation S360.

In response to the TCP SYN/ACK packet, the terminal 100 sends the server 200 a TCP ACK at operation S370. Accordingly, the TCP session is set based on the LTE network 25.

Figure 4:
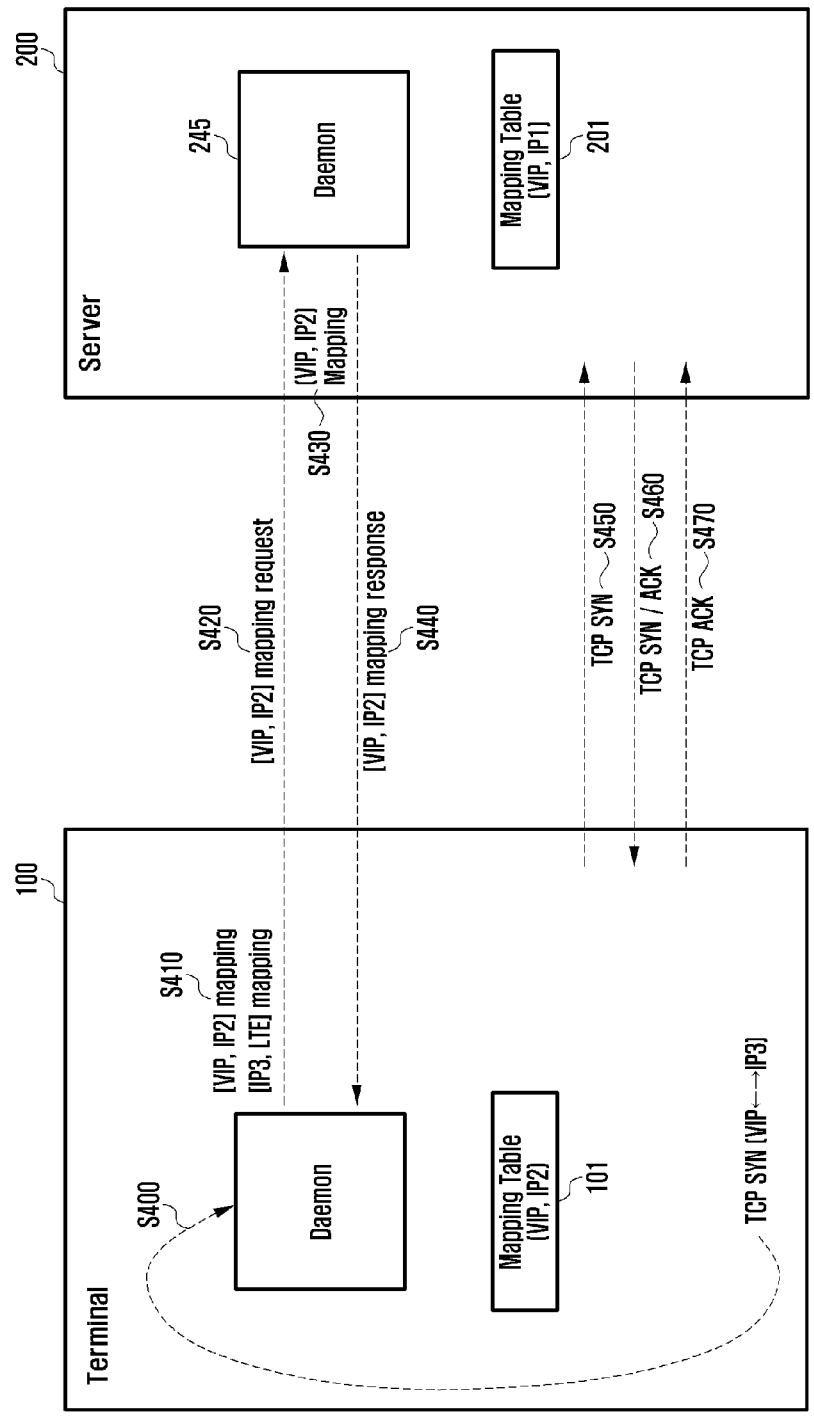
FIG. 4 is a diagram illustrating a connection setup process of the communication service method according to another embodiment of the present disclosure.

FIG. 4 is a diagram illustrating a connection setup process of the communication service method according to another embodiment of the present disclosure. FIG. 4 shows the connection establishment process in the TCP session setup procedure through a Wi-Fi network.

Referring to FIG. 4, the terminal 100 generates a TCP connection request between the virtual address (VIP) and the IP address (IP2) at operation 5400. Here, the TCP connection request may be generated by the OS of the terminal 100 or an application running on the terminal 100, and the daemon 145 may receive the TCP connection request from the OS.

The terminal 100 maps the virtual address (VIP) to the IP address (IP2) and maps the IP address (IP3) to the LTE in the mapping table 101 at operation 5410. The mapping table 101 may include the mapping information for mapping the virtual address (VIP) and the IP address (IP1) and the mapping information for mapping the IP address (IP3) and the LTE. The daemon 145 may control such that the mapping information for mapping the VIP to the IP address (IP1) and the mapping information for mapping the IP address (IP3) to the LTE are included in the mapping table 101.

The terminal 100 sends the server 200 a VIP-IP2 mapping request message to the server 200 at operation 5420. Here, the request message may be transmitted through one of the LTE network 25 and Wi-Fi network 65.

In response to the request message, the server 200 mas the virtual address (VIP) to the IP address (IP2) at operation 5430. The mapping table 201 may include the mapping information for mapping the virtual address (VIP) and the IP address (IP2). The daemon 245 may control such that the mapping information is included in the mapping table 201.

The server 200 sends the terminal 100 a response message in response to the request message at operation 5440. The response message may include the information notifying of the mapping result.

The terminal 100 sends the server 200 a TCP SYN packet at operation S450. The TCP SYN packet may be transmitted after or regardless of the receipt of the response message. The TCP SYN packet may be transmitted through the Wi-Fi network 65 to request for TCP SYN between the IP addresses IP2 and IP3.

The server 200 sends the terminal 100 a TCP SYN/ACK packet at operation 5460.

In response to the TCP SYN/ACK packet, the terminal 100 sends the server a TCP ACK at operation 5470. As a consequence, the TCP session is established through the Wi-Fi network 65.

Figure 5:
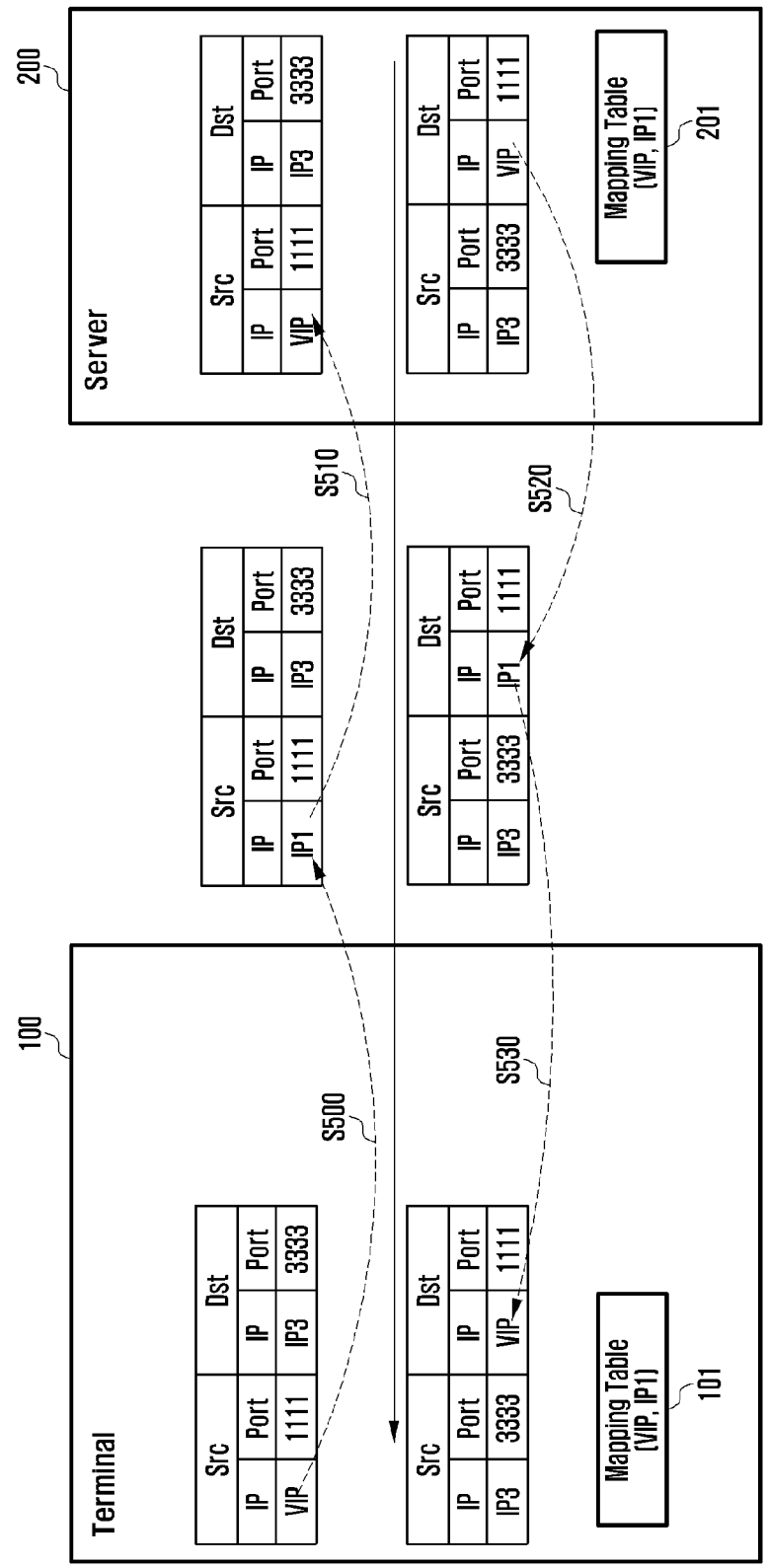
FIG. 5 is a diagram illustrating a packet transmission process of the communication service method according to an embodiment of the present disclosure.

FIG. 5 is a diagram illustrating a packet transmission process of the communication service method according to an embodiment of the present disclosure. In the case of using LTE network, the packet may be delivered between the terminal 100 and the server 200 using the mapping table as shown in FIG. 5. In FIG. 5, "Src" denotes the source and "Dst" denotes the destination.

Referring to FIG. 5, the terminal 100 converts the virtual address (VIP) included in the IP packet to the IP address (IP1) mapped to the virtual address (VIP) at operation 5500. The IP packet may be transferred from the VIF layer 110. The terminal 100 may check that the IP address mapped to the virtual address (VIP) is the IP1 based on the mapping information included in the mapping table 101. In an embodiment, the mapping table 101 may include port information.

The terminal 100 may user the function provided by the OS to convert the virtual address (VIP) to the Physical IP address. For example, in Linux, a DNAT-based method or an IP-in-IP Tunnel-based method can be used. In the case of using DNAT, it is configured to mark the corresponding flow with Netfilter and converts the marked flow to the IP address through the DNAT. In the case of using the IP-in-IP Tunnel, it is configured to mark the corresponding flow with Netfilter and then generate a Routing Rule to transmit the marked flow through the IP-in-IP Tunnel.

The terminal 100 may configure the Routing function of the corresponding OS in order to transmit the corresponding flow through a specific interface after the VIP is converted to the Physical IP address. For example, such configuration is reflected to the iptables rule in Linux.

It is also possible for the daemon 145 to support the IP conversion and Routing function. In this case, the application transfers all outgoing data to the daemon 145, which converts the IP address of the traffic to the Physical IP address and transmits the data through the physical interface. Likewise, the incoming data are received by the daemon 145 and, after converting the IP address to the VIP, and then transferred to the application.

The terminal transmits the IP packet to the server 200 through the LTE network 25 at operation 5510. Here, the server 200 may convert the IP address (IP1) included in the received IP packet to the virtual address (VIP). The server 200 may check the virtual address mapped to the IP address (IP1) using the mapping information included in the mapping table 201.

The server converts the virtual address (VIP) included in the IP packet to the IP address (IP1) mapped to virtual address (VIP) at operation 5520. The virtual address (VIP) included in the IP packet is transferred to the TCP layer 230. The server 200 may check that the IP address mapped to the virtual address (VIP) is the IP address (IP1) using the mapping information included in the mapping table. In an embodiment, the mapping table 201 may include the port information.

The server 200 may use the function provided by the OS for conversion between the virtual address (VIP) and the physical IP address. In Linux, a DNAT-based method or and IP-in-IP Tunnel-based method can be used. In the case of using DNAT, it is configured to mark the corresponding flow with Netfilter and converts the marked flow to the IP address through the DNAT. In the case of using the IP-in-IP Tunnel, it is configured to mark the corresponding flow with Netfilter and then generate a Routing Rule to transmit the marked flow through the IP-in-IP Tunnel.

After the conversion between the VIP and Physical IP, the server 200 may set the routing function of the corresponding OS to transmit the corresponding flow through a specific interface. For example, For example, such configuration is reflected to the iptables rule in Linux.

It is also possible for the daemon 145 to support the IP conversion and Routing function. In this case, the application transfers all outgoing data to the daemon 245, which converts the IP address of the traffic to the Physical IP address and transmits the data through the physical interface. Likewise, the incoming data are received by the daemon 245 and, after converting the IP address to the VIP, and then transferred to the application.

The server 200 sends the terminal 100 the IP packet through the LTE network 25. Here, the terminal 100 may convert the IP address (IP1) included in the IP packet to the virtual VIP. The terminal 100 may check the virtual address mapped to the IP address (IP1) using the mapping information included in the mapping table 101.

Figure 6:
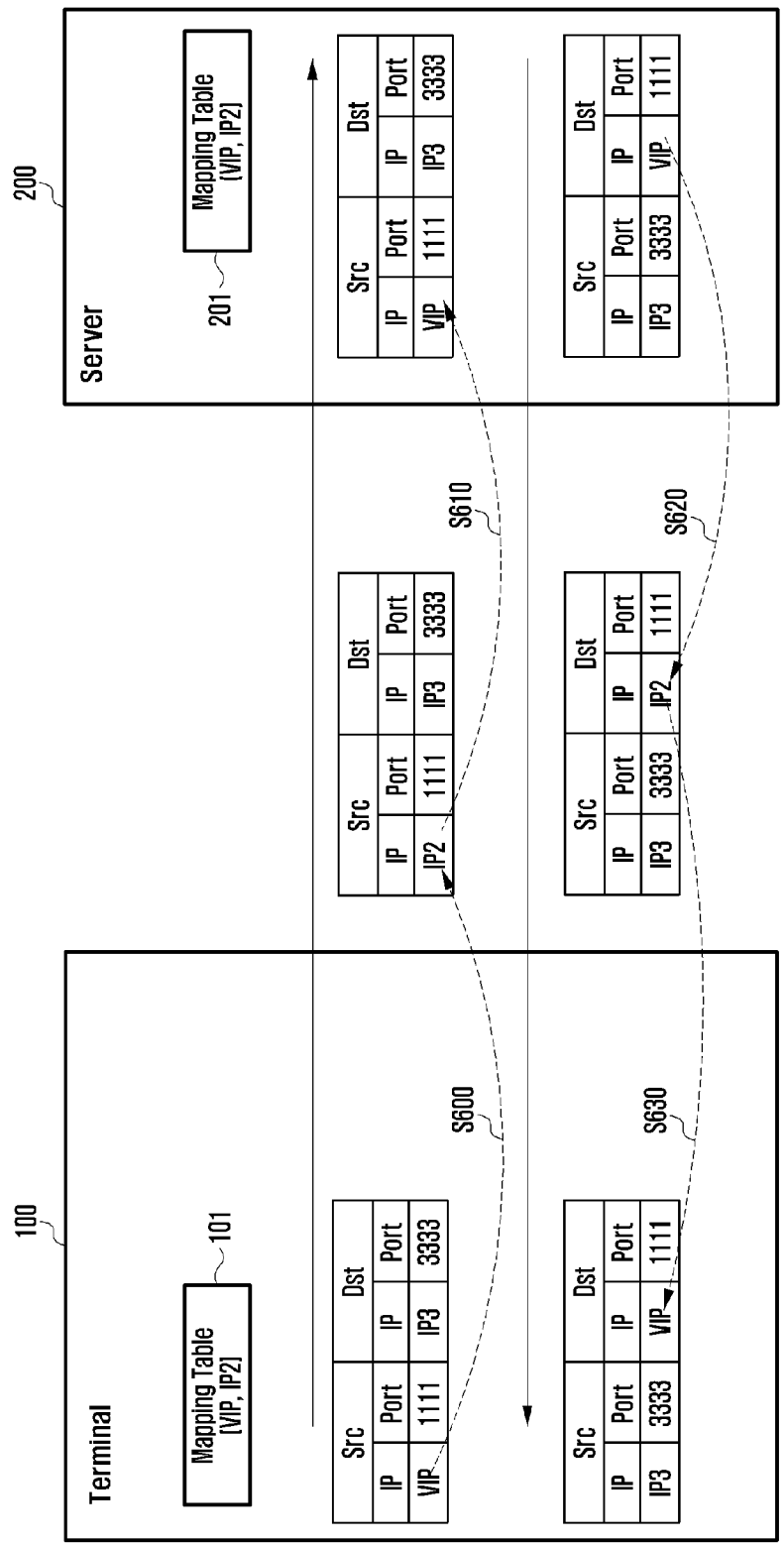
FIG. 6 is a diagram illustrating a packet transmission process of the communication service method according to another embodiment of the present disclosure.

FIG. 6 is a diagram illustrating a packet transmission process of the communication service method according to another embodiment of the present disclosure. In the case of transmitting data through a Wi-Fi network, the packet transmission between the UE 100 and the server 200 may be performed using the mapping table as shown in FIG. 6. In FIG. 6, "Src" denotes the source and "Dst" denotes the destination.

Referring to FIG. 6, the terminal 100 converts the virtual address (VIP) included in the IP packet to the IP address (IP2) mapped to the virtual address (VIP) at operation S600. The IP packet may be transferred from the VIF layer 110. The terminal 100 may check that the IP address mapped to the virtual address (VIP) is the IP2 based on the mapping information included in the mapping table 101. In an embodiment, the mapping table 101 may include port information.

The terminal 100 sends the server 200 the IP packet through the Wi-Fi network 65 at operation S610. Here, the server 200 may convert the IP address IP 2 included in the received IP packet to the virtual address (VIP). The server 200 may check the virtual address mapped to the IP address (IP2) using the mapping information included in the mapping table 201.

The server 200 converts the VIP included in the IP packet to the IP address (IP2) mapped to the VIP at operation S620. The VIP included in the IP packet may be transferred from the TCP layer 230. The server 200 may check that the IP address mapped to the VIP is the IP2 using the mapping information included in the mapping table 201. In an embodiment, the mapping table 201 may include even the port information.

The server 200 sends the terminal 100 the IP packet through the Wi-Fi network 65 at operation S630. The terminal 100 may converts the IP address (IP2) included in the received IP packet to the virtual address (VIP). The terminal 100 may check the virtual address mapped to the IP address (IP2) using the mapping information included in the mapping table 101.

Figure 7:
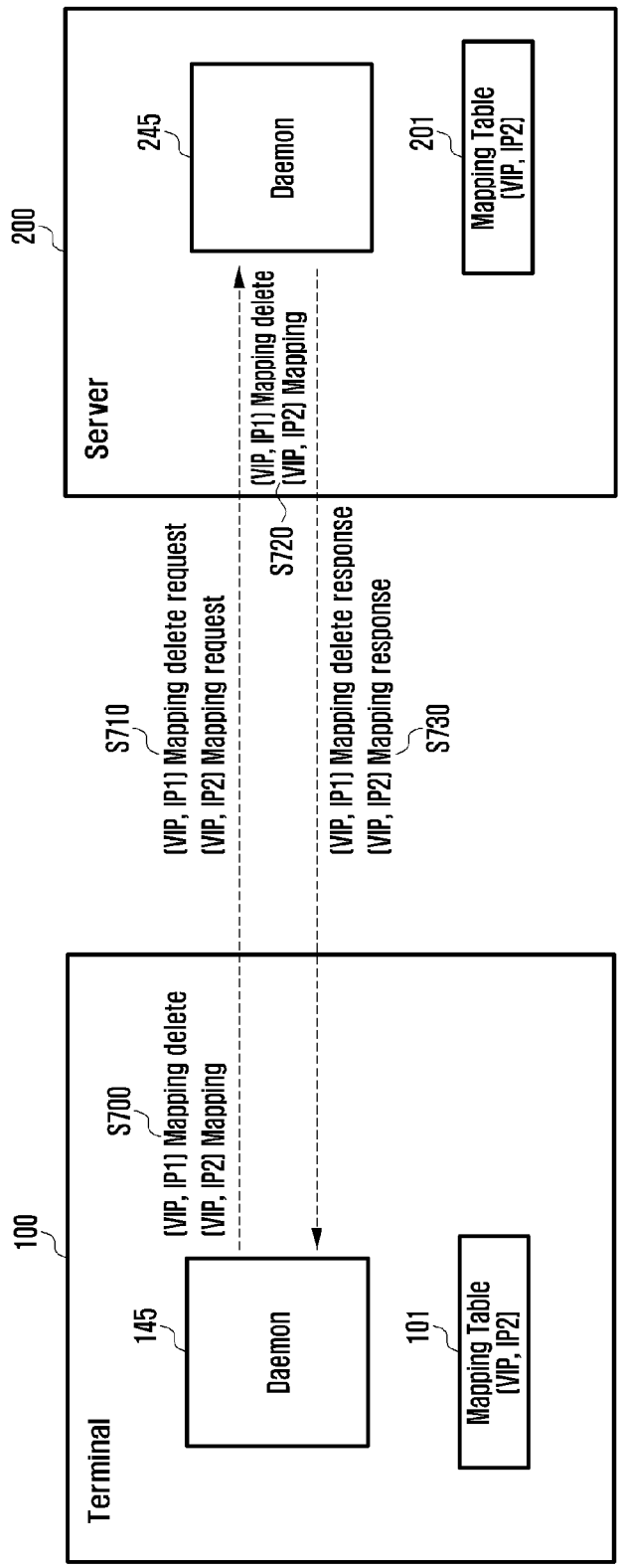
FIG. 7 is a diagram illustrating a handover process of the communication service method according to an embodiment of the present disclosure.

FIG. 7 is a diagram illustrating a handover process of the communication service method according to an embodiment of the present disclosure. In the case of the handover from LTE to Wi-Fi, the mapping table can be generated as shown in FIG. 7.

Referring to FIG. 7, the terminal 100 determines whether handover from a first communication network to a second communication network occurs. The terminal 100 may detect handover occurrence using the information of the legacy Wi-Fi Connection Manager. The terminal 100 may check whether it is connected to a Wi-Fi network so as to perform IP communication. In the case that a Wi-Fi air signal is detected but IP communication is not available, handover is not made from LTE to Wi-Fi. This function may be implemented at the Wi-Fi Connection Manager but, if not, the daemon 145 checks the IP connectivity. Typically, the IP Connectivity is checked in such a way of transmitting/receiving specific data through the Wi-Fi interface.

If the handover occurrence is checked, the terminal 100 deletes the mapping between the virtual address (VIP) and the IP address (IP1) and maps the virtual address (VIP) to the IP address (IP2) at operation S700. Here, the terminal 100 deletes the mapping information between the virtual address (VIP) and the IP address (IP1) from the mapping table 101 and adds the mapping information between the virtual address (VIP) and the IP address (IP2) to the mapping table 101.

The terminal 100 sends the server 200 a message requesting for deleting the mapping between the virtual address (VIP) and the IP address (IP1) and mapping the virtual address (VIP) to the IP address (IP2) at operation S710.

The server 200 receives the message from the terminal 100, deletes the mapping between the virtual address (VIP) and IP address (IP1), and maps the virtual address (VIP) to the IP address (IP2) at operation S720. Here, the server 200 may delete the mapping information between the virtual address (VIP) and the IP address (IP1) from the mapping table 201 and add the mapping information between the virtual address (VIP) and the IP address (IP2) to the mapping table 201.

The server 200 sends the terminal 100 a response message in reply to the request message at operation S720. The response message may include the reply to the VIP-IP1 mapping delete request and the reply to the VIP-IP2 mapping request at operation S730.

Figure 8:
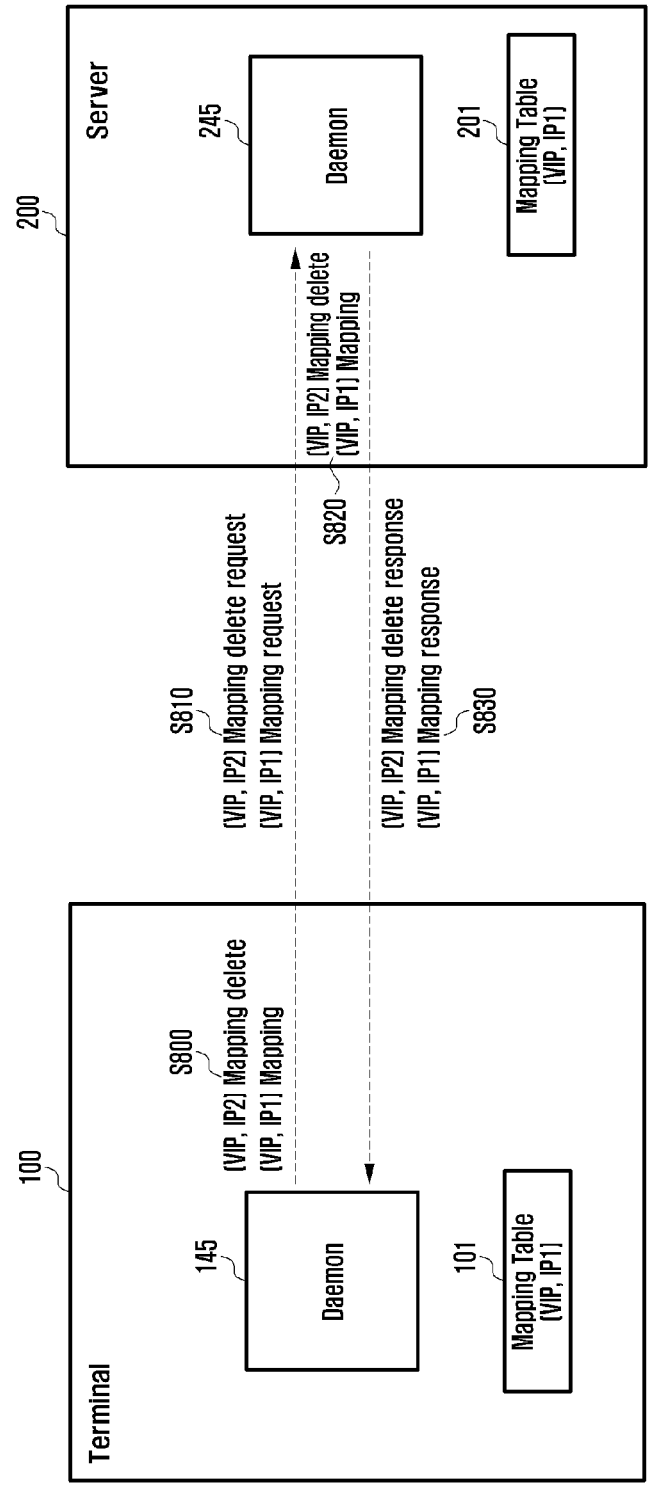
FIG. 8 is a diagram illustrating a handover process of the communication service method according to another embodiment of the present disclosure.

FIG. 8 is a diagram illustrating a handover process of the communication service method according to another embodiment of the present disclosure. In the case of handover from Wi-Fi to LTE, the mapping table may be generated as shown in FIG. 8.

Referring to FIG. 8, the terminal 100 determines whether handover from a first communication network to a second communication network occurs. The terminal 100 may detect handover occurrence using the information of the legacy Wi-Fi Connection Manager. The terminal 100 may check whether it is connected to a Wi-Fi network so as to perform IP communication. In the case that a Wi-Fi air signal is detected but IP communication is not available, handover is not made from LTE to Wi-Fi. This function may be implemented at the Wi-Fi Connection Manager but, if not, the daemon 145 checks the IP connectivity. Typically, the IP Connectivity is checked in such a way of transmitting/receiving specific data through the Wi-Fi interface.

If the handover occurrence is checked, the terminal 100 deletes the mapping between the virtual address (VIP) and the IP address (IP2) and maps the virtual address (VIP) to the IP address (IP2) at operation S800. Here, the terminal 100 deletes the mapping information between the virtual address (VIP) and the IP address (IP2) from the mapping table 101 and adds the mapping information between the virtual address (VIP) and the IP address (IP1) to the mapping table 101.

The terminal 100 sends the server 200 a message requesting for deleting the mapping between the virtual address (VIP) and the IP address (IP2) and mapping the virtual address (VIP) to the IP address (IP1) at operation S810.

The server 200 receives the message from the terminal 100, deletes the mapping between the virtual address (VIP) and IP address (IP2), and maps the virtual address (VIP) to the IP address (IP1) at operation 5820. Here, the server 200 may delete the mapping information between the virtual address (VIP) and the IP address (IP2) from the mapping table 201 and add the mapping information between the virtual address (VIP) and the IP address (IP1) to the mapping table 201.

The server 200 sends the terminal 100 a response message in reply to the request message at operation 5830. The response message may include the reply to the VIP-IP2 mapping delete request and the reply to the VIP-IP1 mapping request.

Figure 9:
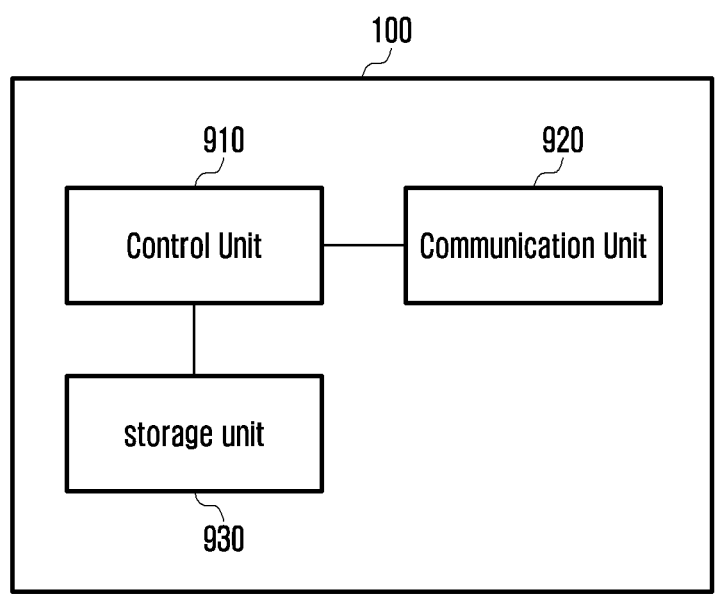
FIG. 9 is a block diagram illustrating a configuration of the terminal according to an embodiment of the present disclosure.

FIG. 9 is a block diagram illustrating a configuration of the terminal according to an embodiment of the present disclosure.

Referring to FIG. 9, the terminal 100 includes a control unit 910, a communication unit 920, and a storage unit 930. The terminal 100 can be any of a User Equipment (UE), a Mobile Station (MS), and a Subscriber Station (SS).

The control unit 910 executes commands and controls the operation of the terminal 100. For example, the control unit 910 may control the input and output of the components and receiving and processing data. The control unit 910 may execute the command related to the information received through the input device.

The control unit 910 executes program codes in cooperation with the OS of the terminal 100 and generates and processes data. The control unit 910 may control the functions of the respective layers 100 to 145 of FIG. 2A and the modules executing the functions. Since various types of OSs are known well, detailed descriptions thereof are omitted herein. Examples of the OS include Windows, Unix, Linux, Palm, DOS, Android, and OS X. The OS, computer codes, and data may be stored in a storage device of the terminal which interoperates with the control unit 910.

The control unit 910 may be implemented on single or multiple chips or a plurality of electric components. For example, various architecture such as dedicated or embedded processor, single-purpose processor, controller, and Application-Specific Integrated Circuit (ASIC) can be used for the control unit 910.

The control unit 910 may recognize the user's action and control the terminal 100 based on the recognition result. The user's action may include physical button selection, a predetermined gesture made on a touchscreen, soft button selection, a predetermined gesture recognized on the image captured by a camera, and a predetermined speech recognized by a speech recognition function. The gesture may include a touch gesture and a hovering gesture.

The control unit 910 may control transmitting a message requesting for mapping a virtual address 120 to an IP address associated with the first communication network and transmitting, when a response message is received, a TCP connection request (SYN) packet to the server 200 through the first communication network. The control unit 910 may control such that the mapping information for mapping the virtual address 120 to the IP address associated with the first communication network is included in the mapping table 101. Here, the first communication network may be the LTE network 25 or the Wi-Fi network 65. The communication unit may receive the IP packet including the first IP address associated with the first communication network from the server 200 through the TCP session set by the TCP connection request (SYN) packet through the first communication network.

The control unit 910 determines whether handover occurs from the first communication network to the second communication network and, if so, controls to transmit a message requesting the server 200 to map the virtual address 120 and the IP address associated with the second communication network. The message may be of requesting the server 200 to delete the mapping between the virtual address 120 and the IP address associated with the first communication network. Here, the second communication network may be a network different from the first communication network or connected to a network interface different from the network interface of the terminal 100 which is connected to the first communication network.

If it is determined that the handover occurs, the control unit 910 may control to change the mapping information for mapping the virtual address 120 to the IP address associated with the first communication network to the mapping information for mapping the virtual address 120 to the second IP address associated with the second communication network.

The control unit 910 controls such that the IP address contained in the destination address field of the IP packet received through the first or second communication network is converted to the virtual address mapped to the IP address. The control unit 910 may check the virtual address mapped to the IP address contained in the destination field of the IP packet received by the communication unit 920 using the mapping information included in the mapping table 101.

The control unit 910 controls such that the virtual address contained in the destination field of the IP packet to be converted to the IP address mapped to the virtual address and controls the communication unit 920 to transmit the IP packet to the server 200. Here, the IP packet may be transferred from the VIF layer 110.

The communication unit 920 transmits to the server a message requesting for mapping the virtual address 120 and the IP address associated with the first communication network and receives a response message in reply to the request message. That is, the message can be transmitted through the second communication network.

If the control unit 910 determines that the handover occurs, the communication unit 920 sends a message requesting the server 200 to map the virtual address 120 and the IP address associated with the second communication network. The message may be of requesting for deleting the mapping between the virtual address 120 and the IP address associated with the first communication network. The communication unit 920 may receive a response message from the server 200 in reply to the request message.

The storage unit 930 stores the mapping table 101.

Figure 10:
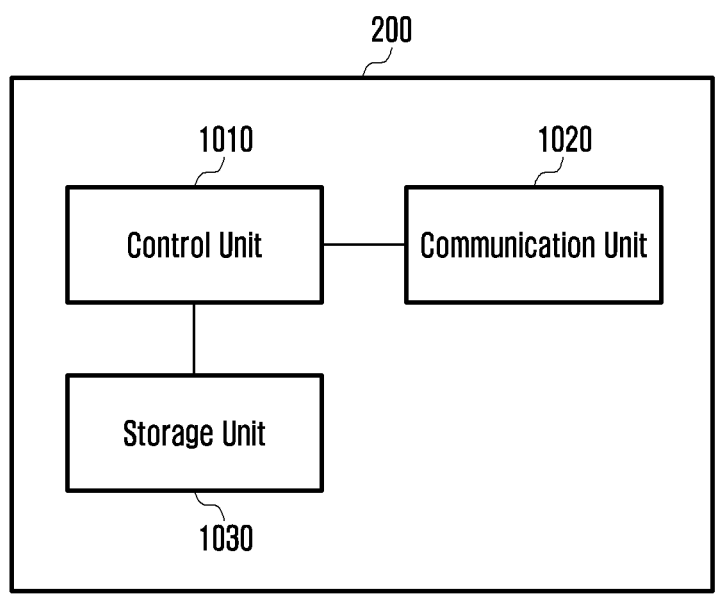
FIG. 10 is a block diagram illustrating a configuration of the server according to an embodiment of the present disclosure.

FIG. 10 is a block diagram illustrating a configuration of the server according to an embodiment of the present disclosure.

Referring to FIG. 10, the server 200 includes a control unit 1010, a communication unit 1020, and a storage unit 1030. The server 200 may be located on the Internet 40 and may be a device providing a web service.

The control unit 1010 executes commands and controls the operation of the server 200. For example, the control unit 1010 may control the input and output of the components and receiving and processing data. The control unit 1010 may execute the command related to the information received through the input device.

The control unit 1010 executes program codes in cooperation with the OS of the server 200 and generates and processes data. The control unit 1010 may control the functions of the respective layers 2100 to 245 of FIG. 2A and the modules executing the functions. Since various types of OSs are known well, detailed descriptions thereof are omitted herein. Examples of the OS include Windows, Unix, Linux, Palm, DOS, Android, and OS X. The OS, computer codes, and data may be stored in a storage device of the server which interoperates with the control unit 1010.

The control unit 1010 may be implemented on single or multiple chips or a plurality of electric components. For example, various architecture such as dedicated or embedded processor, single-purpose processor, controller, and ASIC can be used for the control unit 1010.

If a message requesting for mapping the virtual address 120 and the IP address associated with the first communication network is received, the control unit 1010 may control to transmit a response message in replay to the request message and to add the mapping information for mapping the virtual address 120 and the IP address associated with the first communication network to the mapping table 201. Here, the first communication network may be the LTE network 25 or the Wi-Fi network 65.

If a TCP connection request (SYN) packet is received from the terminal 100 through the first communication network, the control unit 101 may control to transmit the TCP SYN/ACK packet in response to the TCP connection request (SYN) packet. Here, the communication unit 1020 may receive the IP packet including the first IP address associated with the first communication network from the terminal 100 through the TCP session set based on the TCP connection request (SYN) packet.

The communication unit 1020 may receive a message request for mapping the virtual address 120 and the IP address associated with the second communication network. This message may be of requesting for deleting the mapping between the virtual address 120 and the IP address associated with the first communication network. If this message is received, the control unit 1010 substitutes the mapping information for mapping the virtual address 120 and the IP address associated with the second communication network for the mapping information for mapping the virtual address 120 and the IP address associated with the first communication network. The message may be transmitted when it is determined that the terminal's handover occurs from the first communication network to the second communication network. The second communication network may be a network different form the first communication network or connected through a network interface different from the network interface of the terminal 100 which is connected to the first communication network.

The control unit 1010 controls to convert the IP address contained in the source address field of the IP packet which the communication unit 1020 has received through the first or second communication network to the virtual address mapped to the IP address. The control unit 1010 may check the virtual address mapped to the IP address included in the source address field of the IP packet received by the communication unit 1020 using the mapping information included in the mapping table 201.

The control unit 1010 may control to convert the virtual address contained in the source address field of the IP packet to the IP address mapped to the virtual address and transmit the IP packet to the terminal 100. Here, the IP packet may be transferred from the TCP layer 230.

If a message requesting for mapping the virtual address 120 and the IP address associated with the first communication network is received by the communication unit 1020, the control unit 1010 controls such that a response message is transmitted to the terminal 100 in reply to the request message. This message may be transmitted through the first communication network or other communication network. That is, the message may be transmitted through the second communication network.

The storage unit 1030 stores the mapping table 201.

As described above, the method, terminal, and server for providing the communication service according to the present disclosure is advantageous in terms of supporting seamless handover between a cellular network and a wireless IP network regardless of the type of the AP to which it is connected so as to negate extra equipment or facility such as Wi-Fi Access Gateway (WAG).

Also, the method, terminal, and server for providing the communication service according to the present disclosure is advantageous in terms of supporting seamless handover among two or more network interfaces with which the terminal is equipped.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A communication service method of a terminal, the method comprising:
   generating a transmission control protocol (TCP) connection request;
   determining a communication network type for transmitting the TCP connection request to a server;
   mapping a first internet protocol (IP) address associated with a first communication network to a virtual address, when the communication network type is determined to the first communication network;
   transmitting a first mapping request message including first information on the first IP address and the virtual address to the server through the first communication network;
   mapping a second IP address associated with a second communication network to the virtual address, when a handover from the first communication network to the second communication network is detected; and
   transmitting a second mapping request including second information on the second IP address and the virtual address to the server through the second communication network.

2. The method of claim 1,
   wherein the first communication network includes a long term evolution (LTE) network or a wireless fidelity (Wi-Fi) network, and the second communication network is different from the first communication network.

3. The method of claim 1, further comprising:
   in response to the transmitting of the first mapping request message, receiving a first mapping response message from the server; and
   transmitting a TCP connection request (SYN) packet to the server through the first communication network,
   wherein the server translates the first IP address in a received packet into the virtual address, and
   wherein the server translates the virtual address in a packet to be transmitted to the terminal into the first IP address.

4. The method of claim 1, further comprising deleting the mapping of the first IP address to the virtual address, when the handover from the first communication network to the second communication network is detected.

5. The method of claim 4, further comprising transmitting a mapping deletion request message to the server for deleting the mapping of the first IP address to the virtual address, when the handover from the first communication network to the second communication network is detected.

6. The method of claim 1, further comprising, in response to a second mapping request message, receiving a second mapping response message from the server.

7. A terminal comprising:
   a transceiver; and
   at least one processor configured to:
      generate a transmission control protocol (TCP) connection request,
      determine a communication network type for transmitting the TCP connection request to a server,
      map a first internet protocol (IP) address associated with a first communication network to a virtual address, when the communication network type is determined to the first communication network,
      control the transceiver to transmit a first mapping request including first information on the first IP address and the virtual address to the server through the first communication network,
      map a second IP address associated with a second communication network to the virtual address, when a handover from the first communication network to the second communication network is detected, and control the transceiver to transmit a second mapping request including second information on the second IP address and the virtual address to the server through the second communication network.

8. The terminal of claim 7, wherein the first communication network includes a long term evolution (LTE) network or a wireless fidelity (Wi-Fi) network, and the second communication network is different from the first communication network.

9. The terminal of claim 7, wherein the at least one processor is further configured to:
control the transceiver to receive a first mapping response message from the server in response to the first mapping request message, and
control the transceiver to transmit a TCP connection request (SYN) packet to the server through the first communication network,
wherein the server translates the first IP address in a received packet into the virtual address, and
wherein the server translates the virtual address in a packet to be transmitted to the terminal into the first IP address.

10. The terminal of claim 7, wherein the at least one processor is further configured to delete the mapping of the first IP address to the virtual address, when the handover from the first communication network to the second communication network is detected.

11. The terminal of claim 10, wherein the at least one processor is further configured to control the transceiver to transmit a mapping deletion request message to the server for deleting the mapping of the first IP address to the virtual address, when the handover from the first communication network to the second communication network is detected.

12. The terminal of claim 7, wherein the at least one processor is further configured to control the transceiver to receive a second mapping response message from the server in response to a second mapping request message.

13. A communication service method of a server, the method comprising:
receiving a first mapping request message including first information on a first Internet Protocol (IP) address associated with a first communication network and a virtual address from a terminal through the first communication network;
mapping the first IP address to the virtual address based on the first mapping request message;
receiving a second mapping request message including second information on a second IP address associated with a second communication network and the virtual address from the terminal through the second communication network, when a handover from the first communication network to the second communication network is detected; and
mapping the second IP address to the virtual address based on the second mapping request message.

14. The method of claim 13, further comprising:
receiving a mapping deletion request message from the terminal for deleting the mapping of the first IP address to the virtual address, when the handover from the first communication network to the second communication network is detected; and
deleting the mapping of the first IP address to the virtual address based on the mapping deletion request message.

15. The method of claim 13, further comprising:
transmitting a first mapping response message including mapping information of the server to the terminal in response to the receiving of the first mapping request message; and
transmitting a second mapping response message including mapping information of the server to the terminal in response to the receiving of the second mapping request message.

16. A server comprising:
a transceiver; and
at least one processor configured to:
control the transceiver to receive a first mapping request message including first information on a virtual address and a first Internet Protocol (IP) address associated with a first communication network from a terminal through the first communication network,
map the first IP address to the virtual address based on the first mapping request message,
control the transceiver to receive a second mapping request message including second information on a second IP address associated with a second communication network and the virtual address from the terminal through the second communication network, when a handover from the first communication network to the second communication network is detected, and
map the second IP address to the virtual address based on the second mapping request message.

17. The server of claim 16, wherein the at least one processor is further configured to:
control the transceiver to receive a mapping deletion request message from the terminal for deleting the mapping of the first IP address to the virtual address, when the handover from the first communication network to the second communication network is detected, and
delete the mapping of the first IP address to the virtual address based on the mapping deletion request message.

18. The server of claim 17, wherein the at least one processor is further configured to:
control the transceiver to transmit a first mapping response message including mapping information of the server to the terminal in response to the receiving of the first mapping request message, and
control the transceiver to transmit a second mapping response message including mapping information of the server to the terminal in response to the receiving of the second mapping request message.

* * * * *